United States Patent
Pouring et al.

[11] Patent Number: 5,862,788
[45] Date of Patent: Jan. 26, 1999

[54] COMBUSTION CHAMBER FOR DIRECT INJECTED RECIPROCATING PISTON INTERNAL COMBUSTION ENGINE

[75] Inventors: Andrew A. Pouring, Edgewater, Md.; Carlo Leto di Priolo, Milan, Italy

[73] Assignee: Sonex Research, Inc., Annapolis, Md.

[21] Appl. No.: 943,192

[22] Filed: Oct. 3, 1997

[51] Int. Cl.⁶ .................................................. F02F 3/26
[52] U.S. Cl. ........................ 123/276; 123/279; 123/193.6
[58] Field of Search ................ 123/193.6, 262, 123/263, 276, 275, 279, 259, 298

[56] References Cited

U.S. PATENT DOCUMENTS 4,898,135  2/1990  Failla et al. .
5,322,042  6/1994  di Priolo et al. .

*Primary Examiner*—Erick R. Solis
*Attorney, Agent, or Firm*—Bacon & Thomas

[57] ABSTRACT

A combustion chamber for a direct injected, reciprocating piston diesel cycle internal combustion engine in which fuel is injected into a piston recess and wherein the piston includes a reaction chamber adjacent the piston recess that communicates with the combustion chamber through a discrete orifice, wherein the orifice is located so as to discharge reaction products from the reaction chamber into the central portion of a soot cloud that is formed during combustion of fuel each combustion cycle.

3 Claims, 2 Drawing Sheets

COMBUSTION CHAMBER FOR DIRECT INJECTED RECIPROCATING PISTON INTERNAL COMBUSTION ENGINE

BACKGROUND OF THE INVENTION

1. Field of the Invention

This invention relates to a combustion chamber configuration for a reciprocating piston, direct injected diesel cycle internal combustion engine.

2. Related Art

A piston arrangement for achieving improved control over ignition and combustion characteristics of a fuel charge in an internal combustion engine and a process for achieving such controlled ignition and combustion by the generation and management of fuel radical species within the combustion chamber of such an engine is described in U.S. Pat. No. 4,898,135 granted Feb. 6, 1990. In accordance with the patent, a piston for an internal combustion engine, which may be spark or compression ignited, includes a central recess for receiving the majority of each charge during each combustion cycle of the engine, and a reaction chamber adjacent the recess for receiving a portion of the fuel and air of each charge. During each combustion cycle, the portion of the charge that is disposed in the reaction chamber undergoes a cool flame oxidation reaction to produce fuel radicals and intermediate species that are discharged in a next succeeding combustion cycle for seeding the next charge admitted to the combustion chamber.

In accordance with the teachings of the aforesaid patent, the generation and management of fuel radicals requires control over the manner in which the fuel and air of each charge is admitted into the reaction chamber and also the manner in which outgasing of the reaction chamber into the combustion zone occurs. In accordance with U.S. Pat. No. 4,898,135, a continuous slot orifice having critical dimensions is provided to primarily receive fuel and air into the reaction chamber under choked flow conditions during the compression event of each combustion cycle and to enable outgasing of the chamber into the main combustion chamber also under choked flow conditions, whereby a supply of fuel radical species is preserved during each combustion cycle for use in the next combustion cycle due to the time delay in outgasing of the reaction chamber. Optionally, in accordance with the teachings of the prior U.S. Pat. No. 4,898,135, one or more discrete orifices may also be provided to provide communication between the piston recess and the reaction chamber to achieve better control over the admission of fuel to the reaction chamber.

For a complete discussion of the benefits provided by the piston configuration described above, and for a more complete explanation of the manner in which fuel radical species are generated and managed in accordance with a piston having a configuration as described above, reference may be had to the written description and drawings of the U.S. Pat. 4,898,135. Essentially, the patent describes the manner in which controlled seeding of a fuel charge before ignition in an internal combustion engine can be utilized to produce dependable and predictable ignition and knock-free combustion of fuels that otherwise would be considered difficult to ignite without ignition improvers or subject to knock during certain engine operating conditions, depending upon the type of engine utilized. The generation and management of the supply of radicals in the combustion chamber to achieve the recognized benefits of seeding a fuel charge with such radicals involves using a reaction chamber located adjacent a piston recess with a system that provides controlled communication between the main combustion chamber of the engine and the reaction chamber.

In an improvement over the system and process described in U.S. Pat. No. 4,898,135, the continuous slot orifice was eliminated in favor of at least one discrete orifice intended to primarily control admission of the fuel portion of each charge into the reaction chamber and at least one separate discrete orifice located separately from the first discrete orifice and arranged to control admission of primarily air into the reaction chamber. This improvement is described in U.S. Pat. No. 5,322,042 granted Jun. 21, 1994.

Essentially, in accordance with U.S. Pat. No. 5,322,042 the axially extending sidewall of the piston recess similar to that described in U.S. Pat. No. 4,898,135 is provided with at least one discrete orifice that is intended to control admission primarily of fuel into the reaction chamber during each combustion cycle, and at least one separate, physically separated discrete orifice is provided to control admission primarily of air into the reaction chamber. By configuring the orifices and adjusting their location to optimize the fluid circulation and heat transfer conditions within the reaction chamber, optimization of the generation of fuel radical species is achieved. Likewise, outgasing of the radical species into the main combustion chamber during a succeeding combustion cycle (i.e., during the intake event) is also achieved in a more controlled manner, since the location of the orifices will contribute to the injection of the radical species into the main combustion zone.

It has been discovered more recently that reduction of soot (mostly carbon containing particles resulting from partial combustion of fuel) produced during combustion in such combustion chambers in a diesel cycle engine can be markedly achieved if one or more orifices in communication with the reaction chamber are located along the axial wall defining the piston recess so as to effect discharge of radical species from the reaction chamber into a soot cloud in the recess that is formed during the combustion portion of each combustion cycle.

BRIEF SUMMARY OF THE INVENTION

In accordance with the invention, at least one discrete orifice providing communication between the combustion chamber and the reaction chamber is located vertically along the axially extending piston recess sidewall so as to effect high velocity discharge of reaction products from the reaction chamber into a central portion of a soot cloud formed in the piston recess area during each combustion cycle. The soot cloud results from combustion of atomized fuel discharged in a spray pattern by a fuel injector having outlet orifices located in or adjacent the piston recess. The soot cloud emanates axially and radially outwardly from the fuel injector during combustion of the injected fuel spray and is consumed in varying degrees during each combustion cycle by the combustion process if all of the fuel is not reacted with available oxygen. As is well known, complete combustion is not always possible depending upon conditions occurring the combustion chamber during each combustion cycle and it is highly desirable to eliminate as much soot or unburned hydrocarbon elements as possible to eliminate the discharge of soot in the exhaust stream of a direct injected diesel engine.

By discharging the high velocity stream of reaction products from the reaction chamber into the central portion of the soot cloud in the piston recess area during each combustion cycle, typically during the combustion/expansion portion of the cycle, the reaction products contribute to complete combustion of the still unreacted hydrocarbon fuel to thereby reduce soot in the exhaust stream from the combustion chamber.

A more complete description of the invention is provided below in conjunction with the appended drawings.

DETAILED DESCRIPTION OF PREFERRED EMBODIMENTS OF THE INVENTION

Figure 1:
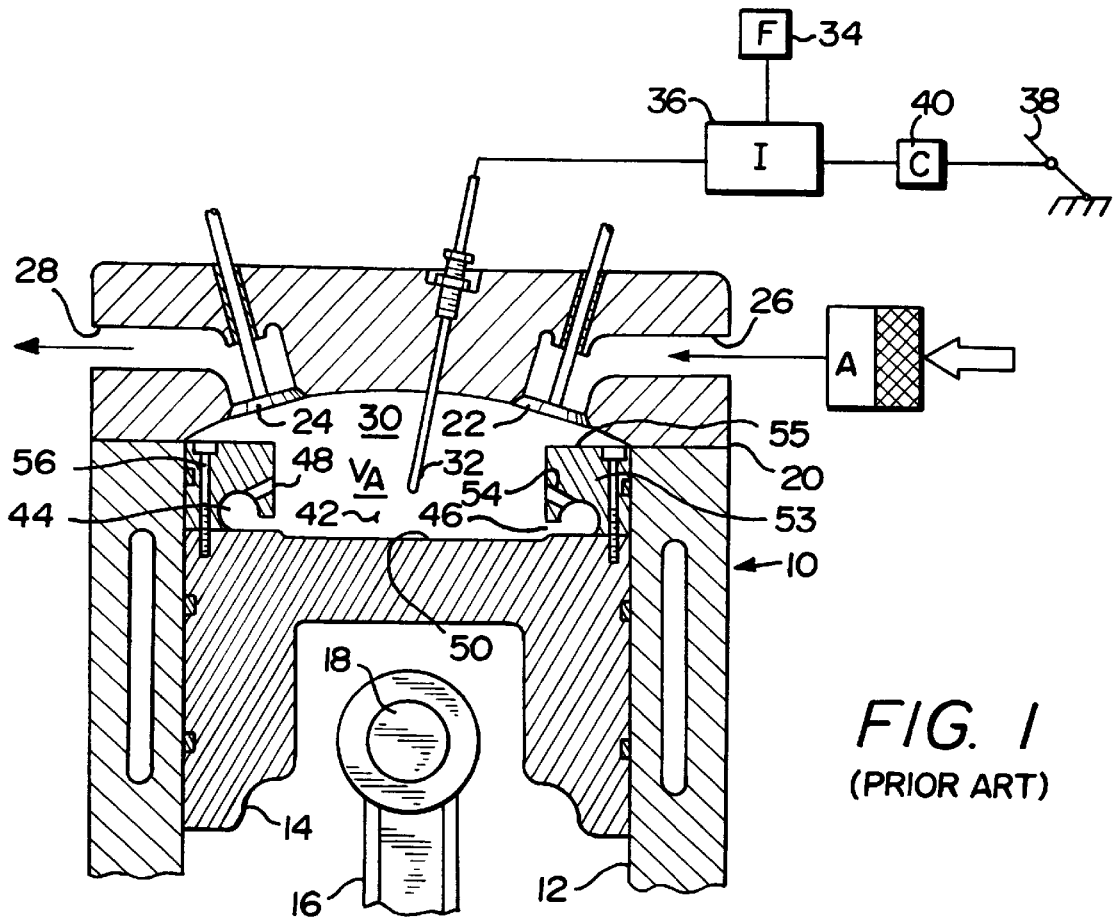
FIGS. 1 and 2 depict prior art direct injected combustion chambers for reciprocating piston diesel cycle internal combustion engines having recessed piston chambers for receiving atomized injected fuel.

FIG. 1 schematically illustrates a side elevation crosssection view of a direct injected, compression ignited (Diesel) type internal combustion engine 10 constructed in accordance with US. Pat No. 4,898,135.

Engine 10 includes a cylinder 12 wherein a reciprocating piston 14 connected to an output crank shaft (not illustrated) via connecting rod 16 attached to piston rod 14 by wrist pin or gudgeon 18 reciprocates axially between bottom and top dead center positions (BDC-TDC) in accordance with well-known principles so as to provide a variable volume combustion chamber between the top side of the piston and the head 20 of the engine.

The piston 14 is shown at top dead center in FIG. 1 at which time conventional intake and exhaust valves 22, 24 providing communication between intake and exhaust ports 26, 28 and the combustion chamber, generally designated at 20, are closed. Valves 22, 24 typically are actuated by any conventional system commonly used for such purposes in internal combustion engine technology so that synchronized opening and closing of the valves 22, 24 enables at least air to be drawn into the combustion chamber through air cleaner A and intake port 26 and compressed during the intake and compression portion of the combustion cycle.

Fuel is admitted by direct, timed injection through fuel injector 32. Compression, combustion and expansion of a charge in the combustion chamber then occur and combustion products are discharged through exhaust port 28 during the exhaust portion of a combustion cycle of the engine.

As mentioned above, fuel is directly injected into the combustion chamber through a fuel injection nozzle 32 which receives fuel from a supply 34 via an injector pump system 36 under the control of an engine speed control (i.e., accelerator pedal 38) through a control module 40, so that atomized fuel is injected into the combustion chamber in a spray pattern as the piston 14 approaches top dead center during the compression portion of the combustion cycle.

In the compression ignition system illustrated in FIG. 1, the combustion of the charge is initiated solely as a result of the charge being subjected to elevated pressure and temperature conditions, whereby spontaneous ignition of the charge occurs at a desired moment. In typical fashion, a glow plug (not illustrated) is utilized to initiate combustion during startup of the engine.

For a further discussion of the system illustrated in FIG. 1, reference may be had to U.S. Pat. No. 4,898,135.

In accordance with the prior art system illustrated in FIG. 1, during each combustion cycle a portion of the fuel and air of each charge is admitted into a reaction chamber 44 that is generally toroidal or curvilinear in crosssection via a continuous slot orifice 46 and optionally through discrete orifices 48. Notably, both the continuous slot 46 and the orifices 48 are intended to directly receive fuel and neither orifice is arranged to receive primarily air alone from the main combustion chamber. The fuel and air in the reaction chamber 44 is partially reacted during each combustion cycle to produce radical species and intermediates of the fuel and oxygen ("fuel radical species") that are utilized in the next successive combustion cycle for seeding the next incoming charge to thereby condition the next charge to achieve desired ignition and heat release characteristics during the next combustion cycle. Reference may be had to the abovementioned U.S. Pat. No. 4,898,135 for a more complete discussion of the generation and management of radical fuel species in accordance with the combustion chamber configuration illustrated in FIG. 1.

Continuing the discussion of the prior art embodiment of FIG. 1, piston 14 is provided with a recess 42 in its crown area that is intended to represent a substantial portion of the volume $V_A$ of combustion chamber 30. Volume $V_A$ is defined as the total clearance volume ($V_C$) in the combustion chamber 30 when piston 14 is at TDC minus the volume $V_B$ of reaction chamber 44 including the orifice areas. Thus, in accordance with this engine configuration, at the point of ignition, upon completion of the compression event during each combustion cycle, recess 42 contains most of the fuel portion of each charge in the combustion chamber volume $V_A$. As described more completely in U.S. Pat. No. 5,898,135, reaction chamber 44 may comprise a single annular reaction chamber, or may comprise a plurality of reaction chambers spaced about the periphery of the recess 42. The recess 42 is defined by a transversely extending bottom wall 50 and axially extending sidewalls 54. In accordance with the embodiment of FIG. 1, the sidewalls 54 are discontinuous to the extent that the continuous slot orifice 46 interrupts the intersection between the sidewalls 54 and the bottom wall 50.

For simplicity of manufacture, the embodiment illustrated in FIG. 1 includes an annular crown block 53 in which the reaction chamber 44 is formed and which includes the sidewalls 54 of the recess 42 in the piston crown area 55. The block 53 is secured to the upper side of the piston 14 by fasteners 56, whereby the reaction chamber 44 can be formed in the block 53 and then the block 53 assembled to the lower portion 14 of the piston.

Figure 2:
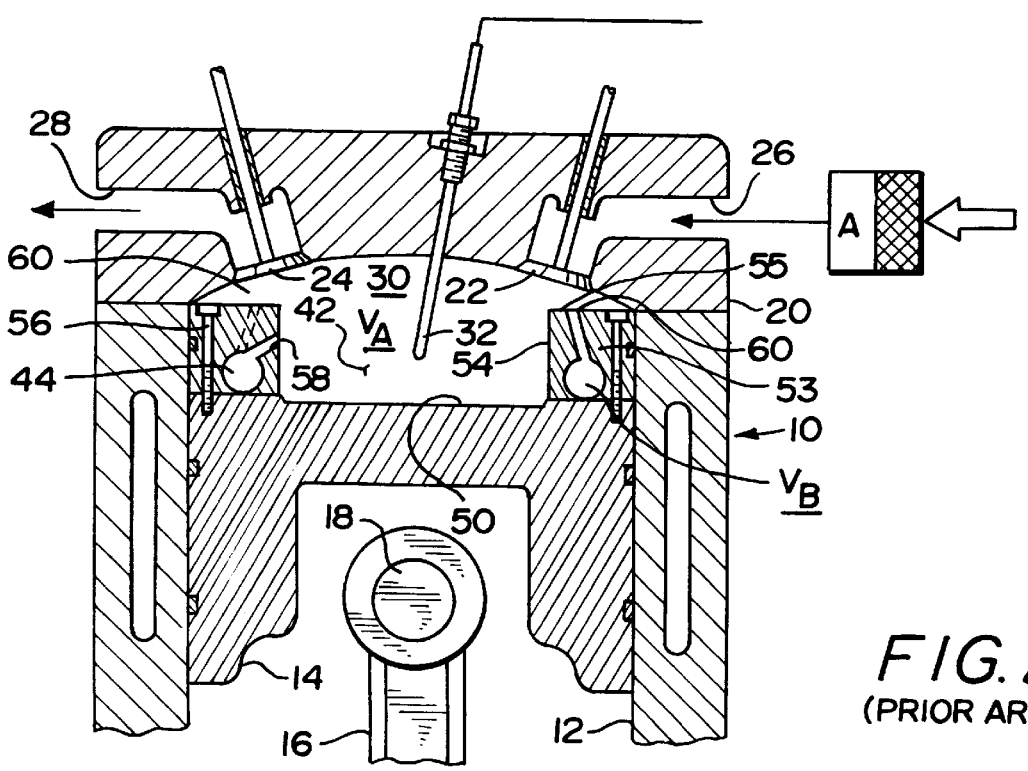

In accordance with the prior art embodiment of FIG. 2, the continuous slot orifice 46 is eliminated in its entirety and instead only discrete orifices are utilized to provide communication between main combustion chamber 30 and the interior of reaction chamber 44. The term "discrete orifice" is intended to distinguish an opening or aperture having a closed and generally symmetric or uniform geometry (e.g., circular, square, etc.) as opposed to a continuous or elongated open slot or gap.

In accordance with this example, discrete orifices are provided to separately control primarily the admission of fuel and air, respectively, into reaction chamber 44. Discrete orifices 58 in this embodiment are provided in the axially extending sidewall 54 of recess 42 in piston 14. Orifice 58 is located so as to be directly impinged by the spray pattern ejected from fuel injector 32 so to ensure the direct supply of fuel into reaction chamber 44 each combustion cycle. In accordance with this (FIG. 2) embodiment, a separate discrete orifice 60 intersecting the crown region 55 of piston 14 (the upper surface of block 53) is provided to control primarily the admission of air into reaction chamber 44. It will be observed that the orifices 58 and 60 are spatially separated from each other so that the spray pattern of fuel from injector 32 does not impinge the area where the air orifice 60 is located. Thus, it will be seen that orifice 58 primarily controls admission of fuel into chamber 44, while orifice 60 primarily controls admission of air into chamber.

In accordance with the FIG. 2 prior art example, orifices 58 and 60 are channeled from the outer walls of block 53 inwardly towards chamber 44 so as to intersect the curvilinear sidewall of chamber 44 tangentially or at least in a direction that will induce vortical swirl in chamber 44. The direction of vortical swirl will be such that fluid flow does not tend to move back out through orifices 58, 60, but rather tends to stay confined within the reaction chamber 44. As seen in FIG. 2, orifices 58 and 60 are both shown as preferably intersecting the curvilinear sidewall of reaction chamber 44 tangentially. Reference may be had to U.S. Pat. No. 5,322,042 for a full description of the prior art example depicted in FIG. 2.

Figure 3:
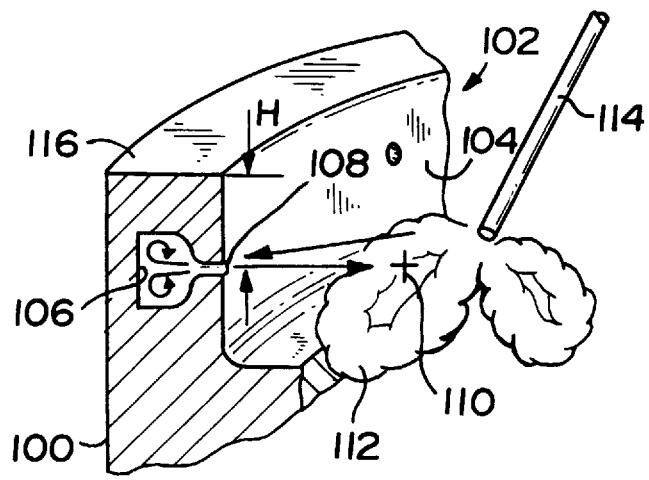
FIG. 3 shows a preferred embodiment of the invention.

FIG. 3 illustrates a preferred embodiment of the invention, wherein recessed piston 100 corresponding to piston 14 in the prior art examples includes an integral piston crown area 102 including axially extending side wall 104 defining the piston recess and in which at least one reaction chamber 106 is provided corresponding functionally with prior art reaction chamber 44 illustrated in FIGS. 1 and 2.

In accordance with this improvement, a primary fuel receiving orifice 108 that provides communication between the reaction chamber 106 and the recess in piston 100 is located axially at a distance or height H along the axial sidewall 104 from the piston crown end that corresponds to the central region 110 of a soot cloud 112 that is typically formed each combustion cycle in the combustion chamber of a direct injected, reciprocating piston diesel cycle internal combustion engine utilizing a recessed piston 100 in a combustion chamber configuration otherwise corresponding with the prior art examples of FIGS. 1 and 2.

The soot cloud 112 is produced following initiation of combustion of fuel discharged in an atomized spray pattern or patterns into the recess area of piston 100. The soot comprises unburned hydrocarbon fuel that is in process of combustion to varying degrees and perhaps at different rates of combustion. Ideally, all of the fuel charge admitted into the combustion chamber is completely combusted or reacted with available oxygen so that no soot is produced in the exhaust stream discharged from the combustion chamber in which piston 100 is located.

However, ideal conditions in the combustion chamber for complete combustion of injected fuel cannot be maintained at all times under all operating conditions so that the discharge of soot in the exhaust stream may not be avoidable under all operating conditions of the engine.

The location H of the orifice 108 (or multiple orifices in typical situations) along the axial side wall 104 is selected so that it (or they) corresponds to the central area 110 of one or more soot clouds typically formed in the combustion chamber during each combustion cycle. Preferably, the position of the injector 114 is adjusted within the recess of the piston crown area 102 so that the central region 110 is axially located at a distance H from the top side 116 of the piston 100.

This relationship between a soot cloud 112, its central zone 110 and the location of an orifice 108 ensures that the discharge of reaction products from reaction chamber 106, which typically occurs at high velocity during the initial expansion portion of the combustion cycle, will be aimed directly at the central portion 110 of the soot cloud 112 during each combustion cycle. The mixture of the reaction products from reaction chamber 106 with the partially reacted fuel or fuel species in the soot cloud 112 markedly reduces the soot component discharged in the exhaust stream from the combustion chamber by promoting complete combustion of the partially reacted fuel. More specifically, the high velocity jet stream exiting orifice 108 from reaction chamber 106 causes a turbulent mixing and swirling of the soot cloud in the combustion chamber to promote complete reaction and combustion of the fuel elements in the soot cloud.

In accordance with the preferred embodiment of the invention, the reaction chamber 106 is formed with generally planar and curved sides that define the chamber in the piston crown area. Moreover, in the preferred example, the orifice 108 communicates with the central area of the reaction chamber 106 as depicted in FIG. 3, whereby the reaction of fuel in the reaction chamber 106 tends to be confined and to build up higher pressure in the reaction chamber that is later discharged at high velocity through orifice 108 towards the central zone 110 of soot cloud 112. The at least partially planar side walls of the reaction chamber 106 are to be distinguished from the curved side walls of the prior art as shown in FIGS. 1 and 2, which were intended to promote internal swirling and heat exchange between the incoming fuel reaching the reaction chamber through the discrete orifices and the side walls of the reaction chamber. It has been observed that locating the orifice 108 centrally with respect to the reaction chamber 106 does not produce a detrimental effect provided that the fuel admitted into the reaction chamber 106 is intensively circulated in the reaction chamber and heated by heat exchange with the piston crown area 102.

Figure 4:
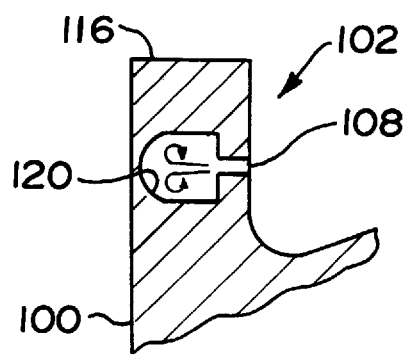
FIG. 4 shows an alternate reaction chamber configuration.

An alternate configuration of the reaction chamber 120 is illustrated in FIG. 4, wherein the planar and curved side walls of the reaction chamber 120 may be reversed as compared with the configuration illustrated in FIG. 3.

In accordance with the prior art as described in U.S. Pat. No. 5,322,042, it was discovered that certain design parameters were important for establishing a relationship between the reaction chamber volume, the combustion chamber volume, and the total orifice area of the orifices 58. The same is true with respect to the present invention, and in particular with regard to the volume of reaction chamber 106, the volume of the combustion chamber above the piston 100 and the total orifice area of orifice 108.

In accordance with the prior art as described in U.S. Pat. No. 5,322,042, the best relationship (Design Index) to be established was defined as follows:

I=X/Y=16 to 26
where:
I=Design Index;
X=$V_c/A_p$
Y=$V_{tdc}/V_{ct}$
$V_c$=individual reaction chamber volume;
$A_p$=total orifice area of discrete orifices communicating with individual reaction chamber;
$V_{tdc}$=total top dead center combustion chamber volume;
$V_{ct}$=total reaction chamber volume(s).

The above value "I" for the Design Index provides a design calculation for any engine to obtain an initial total orifice area for the discrete orifices 108 of any given piston and reaction chamber in a given engine. For a more complete description of how a Design Index may be determined experimentally, reference may be had to U.S. Pat. No. 5,322,042.

In accordance with the present invention, the preferred Design Index may be expressed as (using the same symbols as described in U.S. Pat. No. 5,322,042):

I=X/Y=5–15.

The Design Index of 16–26 in accordance with the prior art was required for $NO_x$ (nitrous oxide) values in the exhaust stream greater than 6 g/Kwh in emission cycle testing. In accordance with this invention, it has been discovered that smaller values of the Design Index are required for $NO_x$ values lower than 6 g/Kwh, more specifically a Design Index value of 5–15. It is believed that this is important because clogging of the orifice(s) 108 can occur at the anticipated retarded injection timing associated with $NO_x$ values of less than 6 g/Kwh. The lower values of the Design Index in accordance with this preferred embodiment have been observed to provide trouble free operation, even with high EGR (exhaust gas recirculation) rates during engine operation.

Figure 5:
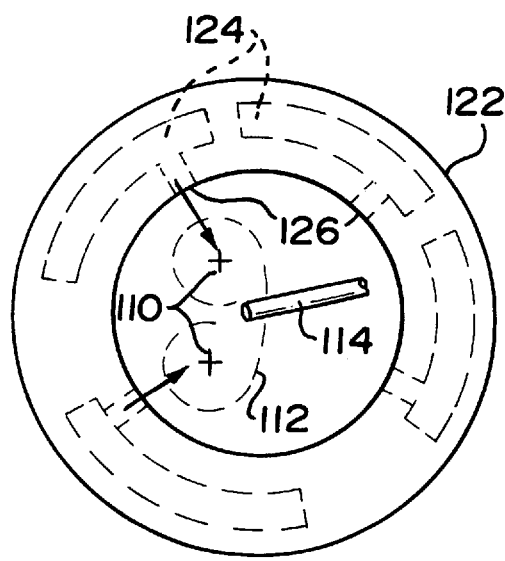
FIG. 5 shows a plan view of a piston crown showing multiple reaction chambers constructed in accordance with the invention.

In accordance with the embodiment of the invention shown in FIG. 5, the crown area of a recessed piston 122 corresponding to the crown area of piston 100 shown in FIG. 3 includes multiple reaction chambers 124 corresponding to reaction chamber 106 in FIG. 3 or 120 in FIG. 4. Each reaction chamber 124 includes at least one discrete orifice 126 corresponding to orifice 108 shown in FIG. 3. Soot clouds 112 are developed during combustion as a result of injection of fuel through fuel injector 114 and it will be noted that each orifice 126 is configured so as to discharge partially reacted fuel (e.g. radicals, etc.) from reaction chambers 124 towards the centers 110 of soot clouds 112. Additional orifices (not illustrated) may be provided to control supply of air or very lean fuel-air mixture into the reaction chambers 124.

It will be understood that the embodiment of the invention described herein is illustrative only and that the invention may take other forms that would be readily apparent to a person skilled in the art without departing from the spirit and scope of the invention as defined in the claims that follow.

WE CLAIM:

1. In a direct fuel injected compression ignition cycle combustion chamber for a reciprocating piston internal combustion engine that includes a variable volume combustion chamber defined by a piston reciprocating in a closed ended cylinder into which a fuel and air charge is periodically supplied for combustion during combustion cycles that include intake, compression, combustion, expansion and exhaust portions, and wherein the crown area of the piston includes a recess defined by a generally axially extending side wall, the recess containing the majority of the charge when the combustion chamber is at minimum volume, and a fuel injector having an outlet orifice for discharging atomized fuel in the recess area of the piston, combustion of injected fuel resulting in the formation of at least one soot cloud including a central portion in the recess, the improvement comprising:

said piston including at least one reaction chamber disposed in the piston crown area adjacent the periphery of the recess; and at least one discrete orifice providing communication between the reaction chamber and the combustion chamber, said orifice located at a height and peripheral location along the recess side wall corresponding to the height and peripheral location in the recess at which the central portion of the soot cloud is formed during each combustion portion of each combustion cycle.

2. The improvement according to claim 1, wherein said orifice intersects said reaction chamber at a central location of the chamber in an axial direction, and said reaction chamber is defined by generally planar side walls.

3. The improvement according to claim 1, wherein said at least one reaction chamber, and orifice comprises a plurality of reaction chambers and associated orifices, each chamber having a volume $V_c$; said discrete orifices have a total cross sectional area of $A_p$; the total volume of the combustion chamber at piston top dead center (minimum volume) position is $V_{tdc}$; and the total volume of the reaction chambers is $V_{ct}$; and wherein the total areas for the discrete orifices satisfies the formula:

X/Y=5 to 15 where:

$X=V_c/A_p$ $Y=V_{tdc}/V_{ct}$.

* * * * *